UNITED STATES PATENT OFFICE.

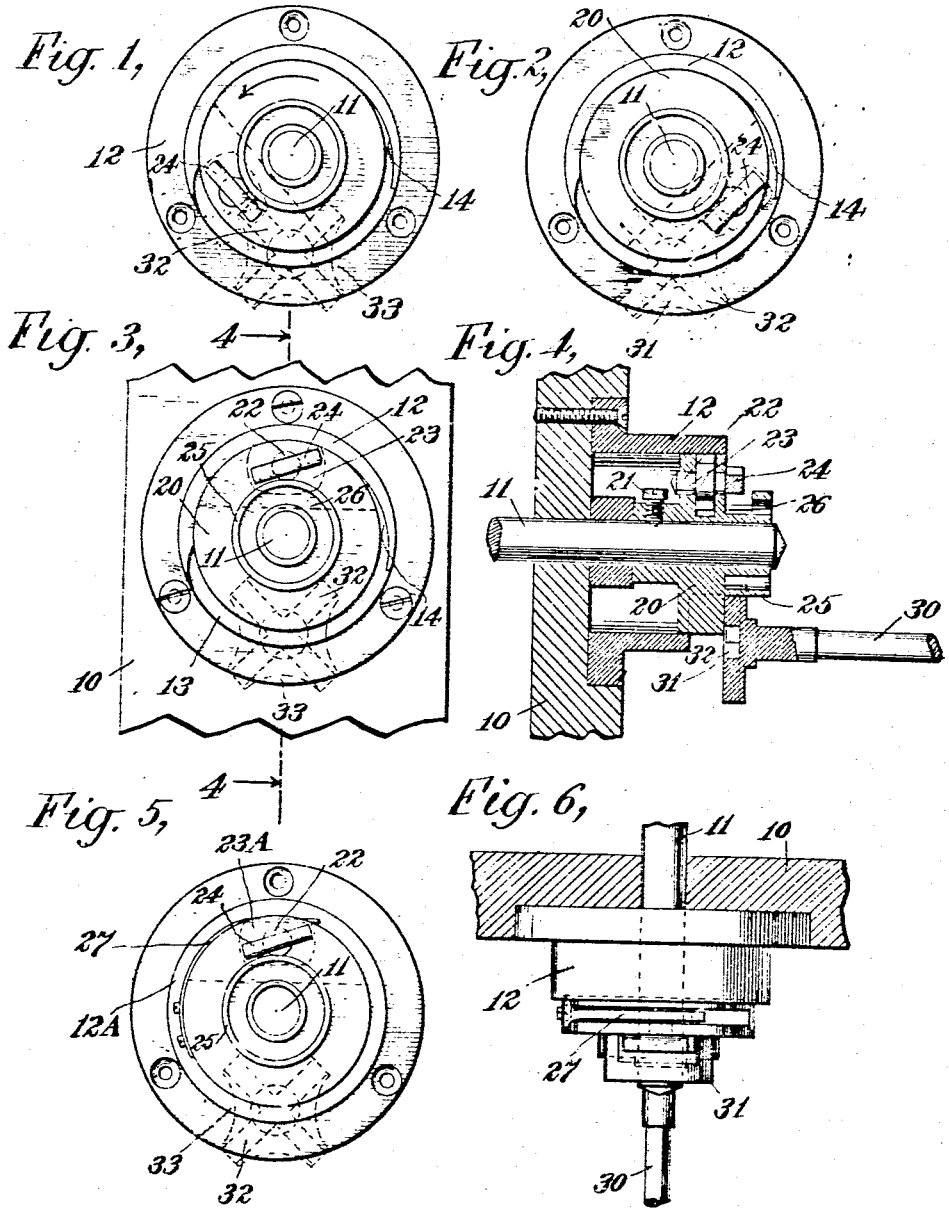

CHARLES R. UEBELMESSER, OF NEW YORK, N. Y., ASSIGNOR TO AMERICAN MOVING PICTURE MACHINE COMPANY, OF NEW YORK, N. Y., A CORPORATION OF NEW YORK.

INTERMITTENT-MOTION MECHANISM.

964,712.
Specification of Letters Patent.
Patented July 19, 1910.

Application filed August 14, 1908. Serial No. 448,519.

*To all whom it may concern:*

Be it known that I, CHARLES R. UEBELMESSER, a subject of Emperor William of Germany, and a resident of the city of New York, in the county of New York and State of New York, United States of America, have invented certain new and useful Improvements in Intermittent-Motion Mechanism, of which the following is a specification.

My invention relates to a mechanism for changing a continuous rotary motion into an intermittent motion, and is especially adaptable for use in conjunction with that part of a mechanism of a moving picture machine which is used for driving the film. Its object is to improve upon such apparatus as has heretofore been known in the art and to provide a simple and efficient arrangement of parts for the above purpose.

To these ends my invention consists in the construction and arrangement of parts which I will describe in the following specification and the novel features of which will be set forth in appended claims.

Referring to the drawings, Figure 1 is a front elevation of a rotary driving mechanism on the end of a driving shaft with a coacting driven part indicated in dotted lines. Figs. 2 and 3 are similar views of the same parts shown in different relative positions. The latter figure shows a part of the frame of a machine to which this mechanism is applied. Fig. 4 is a sectional side elevation of the parts shown in Fig. 3 together with that part which is indicated in the latter figure by dotted lines. The section in this figure is taken on the line 4-4 of Fig. 3. Fig. 5 shows in front elevation a modified form of my invention. Fig. 6 is a plan view of the mechanism shown in Fig. 5 together with the driven member which is indicated by dotted lines in Fig. 5.

Like characters of reference designate corresponding parts in all of the figures.

10 designates a support for the mechanism. This support may be a portion of the frame of a moving picture machine.

11 is a driving shaft to which a rotary motion is imparted by any suitable motive power.

12 is a stationary housing affixed to the support 10 and inclosing a part of the mechanism which I am about to describe.

20 is a rotating member upon the driving shaft 11 and affixed thereto by a set screw 21. A pin 22 is pivotally mounted in the rotating member 20, and to this pin are rigidly affixed a cam 23 and a driving finger 24. A circular hub 25 projects from the forward end of the rotating member 20 and is cut away at 26 to clear the driving finger 24. It is to be noted that the under side of the forward end of the cylindrical portion of the housing 12 is cut away at 13 to allow the cam 23 to rotate while it is passing this part of the housing. At one side of this cut the inside of the housing is arranged to form a long cam surface 14 with which the sides of cam 23 coact.

30 designates the driven shaft upon the end of which is affixed a wheel 31 which has upon its face two diametrically disposed parallel sided grooves 32 at right angles to each other. Between these grooves the periphery of the wheel is milled out on a radius corresponding with that of the hub 25. Such a wheel as this, when driven by a pin, is sometimes called a "Geneva gear." It is the object of this invention to improve upon gears of this kind. When the driving shaft 11 is rotated it will carry the pin 22 and its connected parts with it. When the driving finger 24, moving in the direction of the arrow, reaches the point at which it is shown in Fig. 1, it will stand at an angle which is parallel with that of one of the slots 32. In this Fig. 1 the driving finger is just entering one of these slots, and as it continues its movement, it will travel into this slot and come out of it again when it has reached the position shown in Fig. 2, having, in the meantime, imparted a quarter of a revolution to the wheel 31 and having itself rotated nearly a half of a revolution about its pin. If left in this position during the remainder of the rotation of shaft 11, this driving finger 24 would not be in proper position to enter one of the slots 32. In order to bring it into the proper position to perform this function I have associated with it the rotatable cam 23 and provided the cam face 14 upon the inner surface of the housing 12. During the further rotation of shaft 11 one of the long sides of cam 23 will slide up over cam face 14, and these two parts acting together will turn the pin 22 and the driving finger 24 until the latter has been brought into proper position to repeat the operation above described. In Fig. 3 the cam has been moved up over the cam face and has completed its part of the operation.

I have shown the manner in which a quarter of a revolution is imparted to the shaft 30 during a portion of the revolution of the driving shaft 11. During the remainder of one revolution of the driving shaft 11 the shaft 30 remains at rest. In order to hold it positively at rest and also to insure the slot 32 remaining in proper position for the intake of the driving finger 24 when the latter is again brought around to the wheel 31, the outer cylindrical surface of the hub 25 rests in the portions 33 of the periphery of the wheel 31. The part of the hub opposite the driving finger is cut away so that it does not interfere with the rotation of wheel 31 at this point.

The driving finger is of a width approximately that of the slots 32 so that it has a large bearing surface which will not wear out nor cut the sides of the slots or grooves 32 as does the pin heretofore used. Such devices, when applied to the film driving mechanisms of moving picture machines, are subjected to great wear, and my invention not only insures long life to this part of the apparatus, but provides means for giving the desired intermittent motion to the film in a positive and steady manner.

In Figs. 5 and 6 I have shown a modification of my invention. In this case the driven member is constructed as before described. The driving finger 24 and the pin 22 are similar to those before described. The cam 23ᴬ is also similar to the cam before described, except that its sides may be flat instead of curved. The housing 12ᴬ, however, has no internal cam face but in this case a spring 27 is provided which is affixed to the housing 12ᴬ and is arranged to pass through an opening in the housing and to engage the sides of the cam 23ᴬ. As the cam 23ᴬ rotates from left to right the spring 27 will turn it about its pivot until its sides are in engagement with the spring, so that the driving finger will assume and be maintained in the required position. Otherwise the operation of this form of my invention is similar to that before described.

I have illustrated more than one form of my invention to show that I do not limit myself to any specific form of construction of the parts.

What I claim is:—

1. An intermittent motion mechanism comprising a driven member provided with a slot having a flat side, a driving finger, also having a flat side, arranged to revolve about an axis external to said finger and to engage with the slot during a portion of its revolutions, and means for bringing the side of the driving finger into alinement with the side of the slot at a desired part of its revolutions.

2. An intermittent motion mechanism comprising a driven member provided with a slot having flat parallel sides, a driving finger, also having flat parallel sides, arranged to revolve about an axis external to said finger and to fit into the slot during a portion of its revolutions, and means for bringing said driving finger into position with its sides in alinement with the sides of the slot at a desired part of its revolutions.

3. An intermittent motion mechanism comprising a driven member provided with a parallel sided slot, a driving finger arranged to revolve about an axis external to said finger, a pivot for the driving finger, a cam upon said pivot, a stationary member having a cam surface, said driving finger being arranged to fit into the slot during a portion of its revolutions, said cam and cam surface being arranged to bring the driving finger into alinement with the slot at a desired part of its revolutions.

4. An intermittent motion mechanism comprising a driven member provided with a pair of slots disposed at right-angles to each other, a driving finger arranged to revolve about an axis external to said finger and to engage with one or the other of said slots alternately during a portion of each of its revolutions, and means for bringing said driving finger into alinement with one of the slots at a desired part of its revolutions.

5. An intermittent motion mechanism comprising a driven member provided with a pair of slots disposed at right-angles to each other, a driving finger arranged to revolve about an axis external to said finger, a pivot for the driving finger, a cam upon said pivot, a stationary member having a cam surface, said driving finger being arranged to fit into one of the slots during a portion of each of its revolutions, said cam and cam surface being arranged to bring the driving finger into alinement with one of the slots at a desired part of each of its revolutions.

6. An intermittent motion mechanism comprising a driven member provided with a pair of parallel-sided slots disposed at right-angles to each other, a driving finger arranged to revolve about an axis external to said finger, and to fit into one or the other of the slots during a portion of each of its revolutions, a pivot for the driving finger, a cam upon said pivot, a stationary member having a cam surface, said cam and cam surface being arranged to bring the driving finger into alinement with one of the slots at a desired part of each of its revolutions, and means for holding the driven member during that part of the revolutions of the driving finger about its external axis in which it is not in engagement with one of the slots.

In testimony whereof I have signed my name to this specification in the presence of two subscribing witnesses.

CHARLES R. UEBELMESSER.

Witnesses:
ERNEST W. MARSHALL,
ELLA TUCH.